US009478220B2

(12) United States Patent
Sung et al.

(10) Patent No.: US 9,478,220 B2
(45) Date of Patent: Oct. 25, 2016

(54) FRAME ERROR CONCEALMENT METHOD AND APPARATUS AND ERROR CONCEALMENT SCHEME CONSTRUCTION METHOD AND APPARATUS

(71) Applicant: SAMSUNG ELECTRONICS CO., LTD., Suwon-si, Gyeonggi-do (KR)

(72) Inventors: Ho-sang Sung, Yongin-si (KR); Ki-hyun Choo, Seoul (KR); Jung-hoe Kim, Seoul (KR); Eun-mi Oh, Seongnam-si (KR); Chang-yong Son, Gunpo-si (KR); Kang-eun Lee, Gangneung-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/739,730

(22) Filed: Jun. 15, 2015

(65) Prior Publication Data

US 2015/0279380 A1 Oct. 1, 2015

Related U.S. Application Data

(63) Continuation of application No. 11/843,289, filed on Aug. 22, 2007, now abandoned.

(30) Foreign Application Priority Data

Nov. 30, 2006 (KR) ........................ 10-2006-0120107

(51) Int. Cl.
*G10L 19/00* (2013.01)
*G10L 21/00* (2013.01)

(Continued)

(52) U.S. Cl.
CPC ......... *G10L 19/0017* (2013.01); *G10L 19/005* (2013.01); *G10L 19/022* (2013.01)

(58) Field of Classification Search
USPC ....... 704/200, 201, 206, 207, 208, 219, 220, 704/221, 223, 225, 226, 228, 258, 265, 500
See application file for complete search history.

(56) References Cited

U.S. PATENT DOCUMENTS 5,353,059 A * 10/1994 Lawlor .................. H04N 5/926 348/607
5,673,363 A * 9/1997 Jeon ....................... H04B 1/667 704/206

(Continued)

FOREIGN PATENT DOCUMENTS

JP 10-109409 4/1998
JP 2004-120619 4/2004

(Continued)

OTHER PUBLICATIONS

Perkins, C. et al. "A Survey of Packet Loss Recovery techniques for Streaming Audio" in IEEE Network Magazine, Sep. 1998, vol. 12, Issue 5, pp. 40-48.

(Continued)

*Primary Examiner* — Edgar Guerra-Erazo
(74) *Attorney, Agent, or Firm* — Staas & Halsey LLP

(57) ABSTRACT

Provided are a frame error concealment method and apparatus and an error concealment scheme construction method and apparatus. The frame error concealment method includes generating a new signal by synthesizing a plurality of previous signals that are similar to a signal of an error frame and reconstructing the signal of the error frame using the generated signal.

4 Claims, 9 Drawing Sheets

$$y = (1 - \frac{x}{m})^k, \quad 0 < k \leq 1, \quad 0 \leq x \leq m$$

If BC1 > BC2 (FIRST CORRELATION > SECOND CORRELATION)

$$m = 512 + 2 \times OV\_Size$$

$$k = 1 - \frac{BC1 - BC2}{2}$$

$$F_1(x) = y \quad F_2(x) = 1 - y$$

(51) Int. Cl.
*G10L 13/00* (2006.01)
*G10L 19/005* (2013.01)
*G10L 19/022* (2013.01)

(56) References Cited

U.S. PATENT DOCUMENTS

| | | | | |
|---|---|---|---|---|
| 5,907,822 | A | 5/1999 | Prieto, Jr. | |
| 6,597,961 | B1 * | 7/2003 | Cooke | G10L 19/005 700/94 |
| 6,601,206 | B1 | 7/2003 | Marvasti | |
| 6,952,668 | B1 | 10/2005 | Kapilow | |
| 6,973,425 | B1 | 12/2005 | Kapilow | |
| 6,985,856 | B2 | 1/2006 | Wang et al. | |
| 7,003,448 | B1 | 2/2006 | Lauber et al. | |
| 7,031,926 | B2 | 4/2006 | Makinen et al. | |
| 7,047,187 | B2 | 5/2006 | Cheng et al. | |
| 7,069,208 | B2 * | 6/2006 | Wang | G10H 1/0058 704/211 |
| 7,529,673 | B2 | 5/2009 | Makinen et al. | |
| 7,590,525 | B2 | 9/2009 | Chen | |
| 7,668,712 | B2 | 2/2010 | Wang et al. | |
| 7,693,710 | B2 | 4/2010 | Jelinek et al. | |
| 7,805,297 | B2 * | 9/2010 | Chen | G10L 19/005 704/213 |
| 7,890,322 | B2 | 2/2011 | Dai et al. | |
| 7,912,712 | B2 | 3/2011 | Shlomot et al. | |
| 8,374,856 | B2 | 2/2013 | Kim et al. | |
| 2003/0115043 | A1 * | 6/2003 | Wiese | G10L 19/005 704/200.1 |
| 2003/0177011 | A1 | 9/2003 | Yasuda et al. | |
| 2004/0039464 | A1 | 2/2004 | Virolainen et al. | |
| 2005/0044471 | A1 * | 2/2005 | Chia | G10L 19/005 714/776 |
| 2006/0051068 | A1 | 3/2006 | Gomila | |
| 2006/0062304 | A1 | 3/2006 | Hsia | |
| 2006/0093048 | A9 * | 5/2006 | Taleb | H04B 1/667 375/259 |
| 2006/0262864 | A1 * | 11/2006 | Shi | H04N 19/159 375/240.27 |
| 2006/0265216 | A1 | 11/2006 | Chen | |
| 2006/0271373 | A1 * | 11/2006 | Khalil | G10L 21/045 704/500 |
| 2008/0033584 | A1 | 2/2008 | Zopf et al. | |
| 2008/0046235 | A1 | 2/2008 | Chen | |
| 2009/0319264 | A1 | 12/2009 | Yoshida et al. | |

FOREIGN PATENT DOCUMENTS

| | | |
|---|---|---|
| SG | EP 1458145 | 11/2002 |
| SG | EP 1684267 | 1/2006 |

OTHER PUBLICATIONS

Notice of Allowance mailed Mar. 13, 2015 in related U.S. Appl. No. 11/843,289, 5 pages.

Office Action mailed Jul. 15, 2014 in related U.S. Appl. No. 11/843,289, 11 pages.

Office Action mailed Nov. 7, 2013 in related U.S. Appl. No. 11/843,289, 25 pages.

Office Action mailed Jan. 6, 2011 in related U.S. Appl. No. 11/843,289, 23 pages.

Office Action mailed Jul. 20, 2011 in related U.S. Appl. No. 11/843,289, 32 pages.

Advisory Action mailed Sep. 17, 2014 in related U.S. Appl. No. 11/843,289, 3 pages.

U.S. Appl. No. 11/843,289, filed Aug. 22, 2007, Ho-sang Sung et al., Samsung Electronics Co. Ltd.

* cited by examiner $$y = \left(1 - \frac{x}{m}\right)^{k}, \quad 0 < k \leq 1, \quad 0 \leq x \leq m$$

If BC1 > BC2 (FIRST CORRELATION > SECOND CORRELATION)

$$m = 512 + 2 \times 0V\_Size$$

$$k = 1 - \frac{BC1 - BC2}{2}$$

$$F_1(x) = y \quad F_2(x) = 1 - y$$

If BC2 > BC1 (SECOND CORRELATION > FIRST CORRELATION)

$$m = 512 + 2 \times 0V\_Size$$

$$k = 1 - \frac{BC1 - BC2}{2}$$

$$F_1(x) = 1 - y, \quad F_2(x) = y$$

FRAME ERROR CONCEALMENT METHOD AND APPARATUS AND ERROR CONCEALMENT SCHEME CONSTRUCTION METHOD AND APPARATUS

CROSS-REFERENCE TO RELATED APPLICATIONS

This application is a continuation application of Ser. No. 11/843,289, filed on Aug. 22, 2007, which claims the benefit of Korean Patent Application No. 10-2006-0120107, filed on Nov. 30, 2006, in the Korean Intellectual Property Office, the disclosure of which is incorporated herein in its entirety by reference.

BACKGROUND OF THE INVENTION

1. Field of the Invention

The present invention relates to a method of and apparatus for concealing an error of a frame in the time domain, and more particularly, to a frame error concealment method and apparatus, in which an error of a frame, i.e., a frame error, is concealed by reconstructing a signal of the frame using a signal of a previous frame preceding the error frame and/or a signal of a next frame following the error frame.

2. Description of the Related Art

When some packets are lost or distorted during transmission of an encoded audio signal over a wired/wireless network, an error may be generated in a frame of a decoded audio signal due to a transmission error. Error concealment may be classified into a frequency-domain error concealment scheme and a time-domain error concealment scheme. The frequency-domain error concealment scheme may be divided into a repetition method that reconstructs a signal of an error frame by reusing spectrum coefficients of a previous frame in the error frame and an interpolation method that reconstructs spectrum coefficients of an error frame by interpolating spectrum coefficients of a previous frame and a next frame. However, due to characteristics of Modulated Discrete Cosine Transformation (MDCT) that transforms a time-domain signal into a frequency-domain signal, when the window types of a previous frame and the current frame are different from each other or a burst error occurs, an error of a frame, i.e., a frame error, cannot be concealed using the repetition method or the interpolation method in the frequency domain. In this case, therefore, time-domain error concealment is required.

The time-domain error concealment scheme can also be divided into a repetition method that repetitively reproduces a time-domain sample of a previous frame in an error frame, an interpolation method that reconstructs a time-domain sample of an error frame by interpolating time-domain samples of a previous frame and a next frame, and other methods that reconstruct a signal of an error frame by analyzing a signal of a previous frame. However, in the case of the repetition method in the time domain, when an error occurs over a long interval, the same spectrum signal of a previous frame is repeated over the long interval, causing modulation noise. Moreover, since the interpolation method in the time domain conceals an error with reference to a next frame, it is not easy to use the interpolation method when an error occurs over a long interval. The other methods for time-domain error concealment increase complexity due to the analysis of a signal of a previous frame.

SUMMARY OF THE INVENTION

The present invention provides a frame error concealment method and apparatus using an overlapping method that prevents modulation noise from occurring by synthesizing a plurality of previous signals to reconstruct a signal of an error frame.

The present invention also provides an error concealment scheme construction method and apparatus, in which a plurality of time-domain frame error concealment methods including the overlapping method are properly combined in order to construct an error concealment scheme for concealing frame errors occurring in a plurality of frames in the time domain, thereby maximizing the sound quality of reconstructed signals of the error frames.

The present invention also provides an adaptive frame error concealment method and apparatus, in which an error concealment scheme for concealing frame errors occurring in a plurality of frames is constructed using the frame error concealment scheme construction method and the frame errors are concealed using the constructed error concealment scheme, thereby maximizing the sound quality of reconstructed signals of the error frames.

The present invention also provides a computer-readable recording medium having recorded thereon a program for implementing one of the frame error concealment methods using the overlapping method, the error concealment scheme construction method, and the adaptive frame error concealment method.

According to one aspect of the present invention, there is provided a frame error concealment method including (a) extracting a first signal and a second signal that are similar to a signal of a current frame having an error from a previous frame preceding the current frame, (b) generating a synthetic signal for reconstructing the signal of the current frame using the extracted first signal and second signal, and (c) reconstructing the signal of the current frame using the generated synthetic signal.

(a) may include (a1) searching in the previous frame for a first block and a second block that are similar to a previous block located immediately previous to the current frame and (a2) extracting the first signal and the second signal by referring to the positions of the found first block and second block.

(b) may include (b1) windowing the extracted first signal and second signal and (b2) overlapping and adding the windowed first signal and second signal.

(b1) may include (b11) determining a first window function for windowing the first signal based on correlation between the first block and the previous block and determining a second window function for windowing the second signal based on correlation between the second block and the previous block and (b12) windowing the first signal and the second signal by multiplying the first signal by the determined first window function and multiplying the second signal by the determined second window function.

(b11) may include determining the first window function and the second window function so that the first window function and the second window function are summed as 1. (b11) may include determining the first window function based on the correlation between the first block and the previous block and determining the second window function based on the correlation between the second block and the previous block. (b11) may include determining the first window function and the second window function so that the greater weight is applied to one of the first signal and the second signal whose block has the higher correlation with the previous block. (b11) may include determining the first window function and the second window function so that one of the first signal and the second signal whose block has the higher correlation with the previous block is faded out and the other is faded in.

(c) may include repeating the synthetic signal at least once in the current frame.

According to another aspect of the present invention, there is provided a frame error concealment method including extracting a plurality of signals that are similar to a signal of a current frame having an error from a previous frame preceding the current frame, generating a synthetic signal for reconstructing the signal of the current frame using the extracted plurality of signals, and reconstructing the signal of the current frame using the generated synthetic signal.

According to another aspect of the present invention, there is provided an error concealment scheme construction method including (a) analyzing error concealment conditions of a previous frame preceding and a next frame following a current frame having an error and (b) selecting an error concealment scheme for the current frame from among an overlapping method, a repetition method, and an interpolation method in a time domain based on the analysis result.

(a) may include analyzing at least one of whether an error occurs in the previous frame and if so, an error concealment scheme for the previous frame, whether an error occurs in the next frame, and whether the overlapping method has been used continuously over a predetermined number of times to conceal the error of the previous frame.

According to another aspect of the present invention, there is provided an adaptive frame error concealment method including selecting one of an overlapping method, a repetition method, and an interpolation method in a time domain as an error concealment scheme for a current frame having an error based on error concealment conditions of a previous frame preceding and a next frame following the current frame and concealing the error using the selected error concealment scheme.

According to another aspect of the present invention, there is provided a frame error concealment apparatus including a similar signal extraction unit, a synthetic signal generation unit, and a reconstruction unit. The similar signal extraction unit extracts a first signal and a second signal that are similar to a signal of a current frame having an error from a previous frame preceding the current frame. The synthetic signal generation unit generates a synthetic signal for reconstructing the signal of the current frame using the extracted first signal and second signal. The reconstruction unit reconstructs the signal of the current frame using the generated synthetic signal.

The similar signal extraction unit may search in the previous frame for a first block and a second block that are similar to a previous block located immediately previous to the current frame and extracts the first signal and the second signal by referring to the positions of the found first block and second block.

The first block and the second block may have the highest correlation with the previous block.

The synthetic signal generation unit may include a windowing unit windowing the extracted first signal and second signal and a synthesis unit overlapping and adding the windowed first signal and second signal.

The windowing unit may include a window function determination unit and a multiplication unit. The window function determination unit determines a first window function for windowing the first signal based on correlation between the first block and the previous block and determines a second window function for windowing the second signal based on correlation between the second block and the previous block. The multiplication unit windows the first signal and the second signal by multiplying the first signal by the determined first window function and multiplying the second signal by the determined second window function.

The window function determination unit may determine the first window function and the second window function so that the first window function and the second window function are summed as 1. The window function determination unit may determine the first window function based on the correlation between the first block and the previous block and determine the second window function based on the correlation between the second block and the previous block. The window function determination unit may determine the first window function and the second window function so that the greater weight is applied to one of the first signal and the second signal whose block has the higher correlation with the previous block. The window function determination unit may determine the first window function and the second window function so that one of the first signal and the second signal whose block has the higher correlation with the previous block is faded out and the other is faded in.

The reconstruction unit may repeat the synthetic signal at least once in the current frame.

According to another aspect of the present invention, there is provided a frame error concealment apparatus including a similar signal extraction unit, a synthetic signal generation unit, and a reconstruction unit. The similar signal extraction unit extracts a plurality of signals that are similar to a signal of a current frame having an error from a previous frame preceding the current frame. The synthetic signal generation unit generates a synthetic signal for reconstructing the signal of the current frame using the extracted plurality of signals. The reconstruction unit reconstructs the signal of the current frame using the generated synthetic signal.

According to another aspect of the present invention, there is provided an error concealment scheme construction apparatus including an analysis unit and a selection unit. The analysis unit analyzes error concealment conditions of a previous frame preceding and a next frame following a current frame having an error. The selection unit selects an error concealment scheme for the current frame from among an overlapping method, a repetition method, and an interpolation method in a time domain based on the analysis result.

The analysis unit may analyze at least one of whether an error occurs in the previous frame and if so, an error concealment scheme for the previous frame, whether an error occurs in the next frame, and whether the overlapping method has been used continuously over a predetermined number of times to conceal the error of the previous frame.

According to another aspect of the present invention, there is provided an adaptive frame error concealment apparatus including an error concealment scheme selection unit and an error concealment unit. The error concealment scheme selection unit selects one of an overlapping method, a repetition method, and an interpolation method in a time domain as an error concealment scheme for a current frame having an error based on error concealment conditions of a previous frame preceding and a next frame following the current frame. The error concealment unit conceals the error using the selected error concealment scheme.

According to another aspect of the present invention, there is provided a computer-readable recording medium having recorded thereon a program for implementing one of the frame error concealment method, the error concealment scheme construction method, and the adaptive frame error concealment method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Hereinafter, a frame error concealment method and apparatus using an overlapping method, an error concealment construction method and apparatus, and an adaptive frame error concealment method and apparatus according to exemplary embodiments of the present invention will be described in detail with reference to the accompanying drawings.

First, a frame error concealment method using an overlapping method (hereinafter, referred to as an overlapping method) according to an exemplary embodiment of the present invention will be described. Prior to the explanation of the overlapping method, a frame error concealment method using a repetition method (hereinafter, referred to as a repetition method) will be described.

Figure 1:
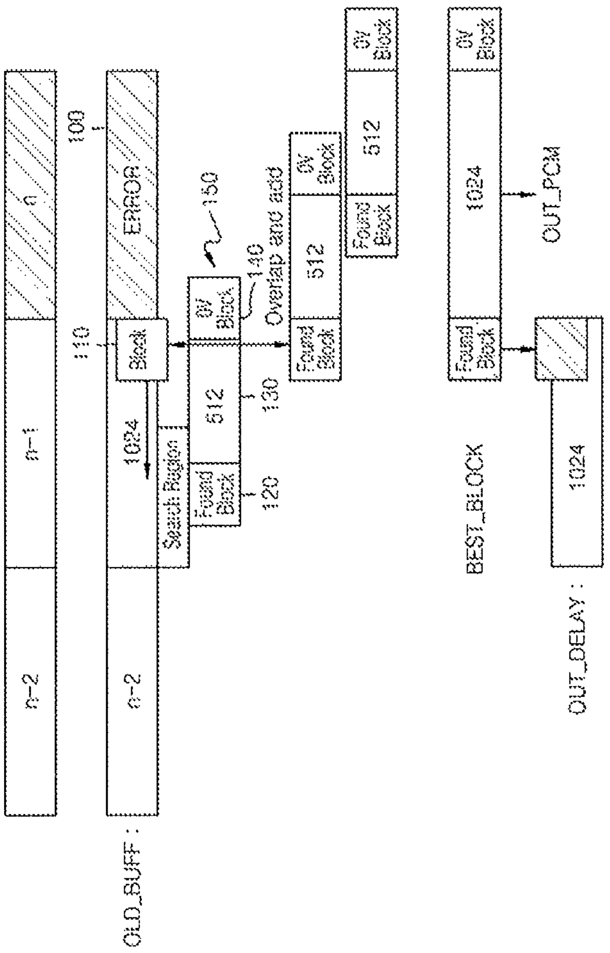
FIG. 1 is a reference diagram for explaining a frame error concealment method using a repetition method according to an exemplary embodiment of the present invention.

FIG. 1 is a reference diagram for explaining the repetition method according to an exemplary embodiment of the present invention. The repetition method searches in a previous frame for a signal that is similar to a signal of the current frame having an error and copies the found signal to the current frame, thereby reconstructing a signal of the current frame.

Once it is determined that an error occurs in the current $n^{th}$ frame 100, a similar block 120 having the highest correlation with a signal of a previous block 110 located immediately previous to the $n^{th}$ frame 100 is searched for in a search region of a previous frame preceding the current $n^{th}$ frame 100. For example, the correlation can be calculated as follows:

$$R(d) = \frac{\sum_{k=0}^{K} S(k)S(k-d)}{\sqrt{\sum_{k=0}^{K} S^2 \sum_{k=0}^{K} S^2(k-d)}}, \quad (1)$$

where R(d) is a correlation, S(n) is a signal of a previous frame, and d is the position of a sample in a search region. As illustrated in FIG. 1, once the similar block 120 having the highest correlation with the previous block 110 is found, a previous signal 150 including the found similar block 120 and the following next signals 130 and 140 of a predetermined length are copied to an error frame. Referring to FIG. 1, the previous signal 150 includes the signal 130 that is directly output as a signal of the $n^{th}$ frame 100, the similar block 120 preceding the signal 130, and the overlapping block 140 of the same size as the similar block 120, which follows the signal 130. The reason why the similar block 120 and the overlapping block 140, together with the signal 130, are copied to the $n^{th}$ frame 100 is to prevent a discontinuous signal from being output at a boundary between an $(n-1)^{th}$ frame and the $n^{th}$ frame by overlapping and adding the previous block 110 at the boundary of the $(n-1)^{th}$ frame to the similar block 120 copied to the $n^{th}$ frame. Similarly, the reason why the overlapping block 140, together with the signal 130, is copied to the $n^{th}$ frame is to prevent discontinuity at the boundary between the $(n-1)^{th}$ frame and the $n^{th}$ frame by overlapping and adding the overlapping block 140 copied to the $n^{th}$ frame to a start portion of an $(n+1)^{th}$ frame when the $n^{th}$ frame and the $(n+1)^{th}$ frame are good frames. Thus, when a window function is used on a signal of the $(n-1)^{th}$ frame to reconstruct the $n^{th}$ frame by copying the signal of the $(n-1)^{th}$ frame, the size of the window function may be determined using a linear function, a polynomial function, or a trigonometric function in the similar block 120 or the overlapping block 140 where overlapping occurs and a rectangular window may be used in the signal 130 where overlapping does not occur. Here, it has to be noted that weights applied to two functions in the overlapping of two blocks are summed as 1. Therefore, for using a window function on a block that overlaps the similar block 120 or the overlapping block 140, it is desirable to use a window that is out of phase with a window used for the similar block 120 or the overlapping block 140.

However, as mentioned above, when a previous signal is repeated over a long interval, the repetition method may cause modulation noise due to repetition of a signal having the same spectrum over the long interval. Therefore, it is necessary to prevent the occurrence of modulation noise while reconstructing an error frame using a previous signal.

Figure 2:
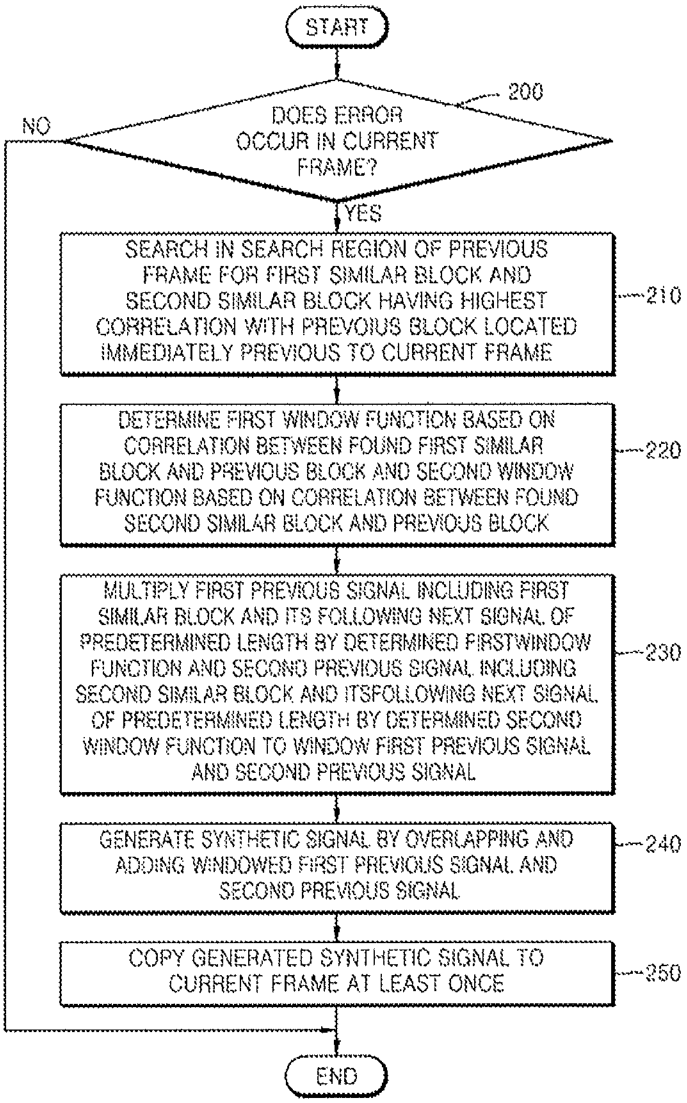
FIG. 2 is a flowchart illustrating a frame error concealment method using an overlapping method according to an exemplary embodiment of the present invention.
Figure 3:
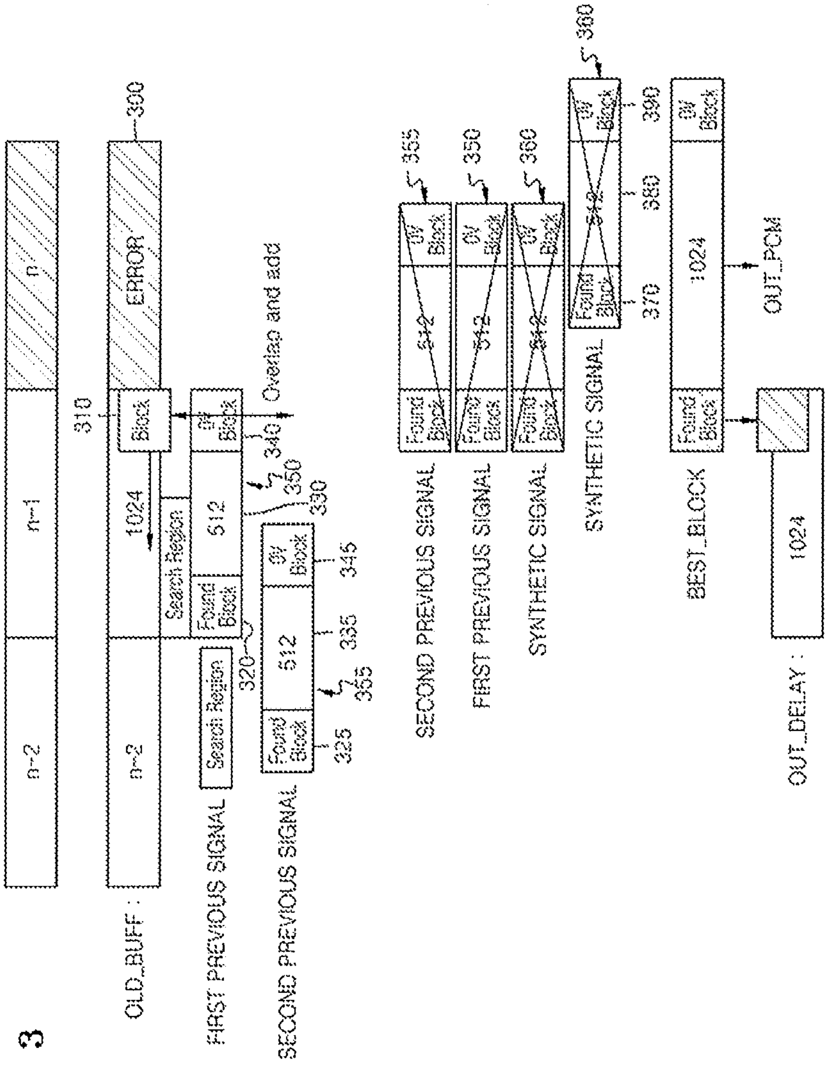
FIG. 3 is a reference diagram for explaining a frame error concealment method using an overlapping method according to an exemplary embodiment of the present invention.

Hereinafter, an overlapping method according to an exemplary embodiment of the present invention will be described with reference to FIGS. 2 and 3. FIG. 2 is a flowchart illustrating an overlapping method according to an exemplary embodiment of the present invention, and FIG. 3 is a reference diagram for explaining the overlapping method according to an exemplary embodiment of the present invention. The overlapping method searches in a previous frame for a plurality of signals that are similar to a signal of the current error frame, generates a new signal by synthesizing the found signals, and copies the generated new signal to the current error frame, thereby reconstructing the signal of the current error frame.

Referring to FIGS. 2 and 3, in operation 200, it is determined whether an error occurs in the current $n^{th}$ frame 300.

When it is determined that an error occurs in the $n^{th}$ frame 300 in operation 200, two similar blocks having the highest correlation with a signal of a previous block 310 located immediately previous to the $n^{th}$ frame 300 are searched for in a search region of a previous frame in operation 210. Let the first found similar block be a first similar block 320 and let the second found similar block be a second similar block 325.

In operations 220 through 240, a first previous signal 350 including the found first similar block 320 and its following first next signal 330 of a predetermined length and a second previous signal 355 including the found second similar block 325 and its following second next signal 335 of a predetermined length are synthesized in order to generate a synthetic signal 360 for reconstructing the $n^{th}$ frame 300. Referring to FIG. 3, the synthetic signal 360 includes a similar block 370, a portion 380 that is directly used for reconstructing a signal of the $n^{th}$ frame 300, and an overlapping block 390.

Since the first similar block 320 and the second similar block 325 have the highest correlation with the previous block 310, consecutive next signals 330 and 340 following the first similar block 320 and consecutive next signals 335 and 345 following the second similar block 325 may be similar to the signal of the $n^{th}$ frame 300. Here, as mentioned previously, the first similar block 320 and the first overlapping (OV) block 340 are included in the first previous signal 350, and the second similar block 325 and the second overlapping (OV) block 345 are included in the second previous signal 355, so as to cause the synthetic signal 360 to include the similar block 370 and the overlapping block 390, thereby preventing the occurrence of discontinuity at the boundary between the synthetic signal 360 and a signal that has been output before or is to be output after the synthetic signal 360 when the synthetic signal 360 is copied to the current frame. In other words, the synthetic signal 360 can be smoothed by overlapping and adding the similar block 370 to the signal preceding the synthetic signal 360 or overlapping and adding the overlapping block 390 to the signal following the synthetic signal 360.

Hereinafter, operations 220 through 240 for generating the synthetic signal 360 by synthesizing the first previous signal 350 and the second previous signal 355 will be described in more detail.

In operation 220, a first window function for windowing the first previous signal 350 and a second window function for windowing the second previous signal 355 are determined based on a correlation between the first similar block 320 and the previous block 310 and based on a correlation between the second similar block 325 and the previous block 310, respectively. Here, it is preferable that the first window function and the second window function be summed as 1. It is also desirable to determine the first window function and the second window function so that the greater weight is applied to one of the first previous signal 350 and the second previous signal 355 whose block has the higher correlation with the previous block 310. By doing so, a previous signal, which is more similar to a signal of an error frame than the other previous signal, is used as the larger part of the synthetic signal 360 generated by synthesizing the first previous signal 350 and the second previous signal 355 that are windowed by being multiplied by window functions, thereby generating the synthetic signal 360 that more approximates the signal of the error frame.

The first window function and the second window function may also be determined so that in the synthetic signal 360 generated by synthesizing the first previous signal 350 and the second previous signal 355, one of the first previous signal 350 and the second previous signal 355 whose block has the higher correlation with the previous block 310 is faded out and the other previous signal is faded in.

Figure 4A:
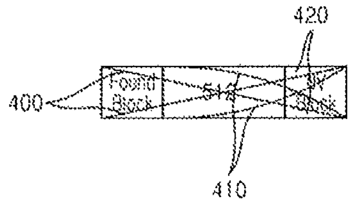
FIGS. 4A, 4B and 4C are reference diagrams for explaining the determination of a first window function and a second window function illustrated in FIG. 2.
Figure 4B:
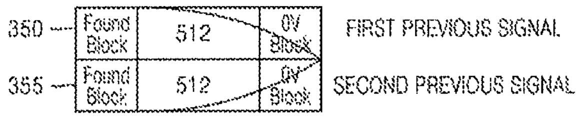
Figure 4C:
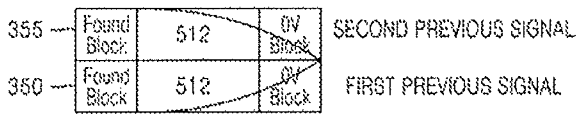

FIGS. 4A, 4B and 4C are reference diagrams for explaining the determination of the first window function and the second window function based on a correlation between the first similar block 320 with the previous block 310 and a correlation between the second similar block 325 with the previous block 310. According to an exemplary embodiment of the present invention, the first window function and the second window function are determined as follows:

$$F(x) = \left(1 - \frac{x}{m}\right)^k \quad (0 \le k \le 1,\ 0 \le x \le m), \tag{2}$$

where m is the number of time-domain samples constituting the first previous signal 350 and the second previous signal 355 or the synthetic signal 360. As illustrated in FIGS. 4A, 4B and 4C, F(x) is a linear function 410 that reduces from 1 to 0 for k=1 and is a constant function having a value of 1 for k=0. Thus, for 0≤k≤1, F(x) ranges between the linear function 410 and the constant function.

As illustrated in FIGS. 4A, 4B and 4C, the first window function $F_1(x)$ and the second window function $F_2(x)$ are determined as in Equation 3 for the correlation of the first similar block 320 with the previous block 310, which is a higher correlation than the correlation of the second similar block 325 with the previous block 310, and are determined as in Equation 4 for the correlation of the second similar block 325 with the previous block 310, which is a higher correlation than the correlation of the first similar block 320 with the previous block 310.

$$F_1(x) = y = \left(1 - \frac{x}{m}\right)^k,\ F_2(x) = 1 - y \qquad k = 1 - (BC1 - BC2)/2 \tag{3}$$

$$F_1(x) = 1 - y,\ F_2(x) = y = \left(1 - \frac{x}{m}\right)^k \qquad k = 1 - (BC1 - BC2)/2, \tag{4}$$

where BC1 is a correlation between the first similar block 320 and the previous block 310, BC2 is a correlation between the second similar block 325 and the previous block 310, and m is the number of time-domain samples included in the first previous signal 350 and the second previous signal 355 or the synthetic signal 360.

As discussed above, according to an exemplary embodiment of the present invention, the first window function and the second window function are determined so that the greater weight is applied to one of the first previous signal 350 and the second previous signal 355 whose block has the higher correlation with the previous block 310. Additionally, the first window function and the second window function are determined so that one of the first previous signal 350 and the second previous signal 355 whose block has the higher correlation with the previous block 310 is output prior to the other previous signal, thereby causing the synthetic signal 360 generated by synthesizing the first previous signal 350 and the second previous signal 355 that are windowed by the first window function and the second window function, so as to more approximate the signal of the current $n^{th}$ frame.

After the determination of the first window function and the second window function in operation 220, the first previous signal 350 and the second previous signal 355 are windowed by being multiplied by the determined first window function and the determined second window function, respectively, in operation 230, and then are overlapped and added to each other, thereby generating the synthetic signal 360 in operation 240.

In operation 250, the generated synthetic signal 360 is copied to the $n^{th}$ frame at least once. The start portion of the synthetic signal 360 is smoothed by overlapping and adding the similar block 370 of the synthetic signal 360 to the previous block 310 of the previous $(n-1)^{th}$ frame, so as to prevent discontinuity at a boundary between the synthetic signal 360 and another signal. Alternatively, the end portion of the synthetic signal 360 is smoothed by overlapping and adding the overlapping block 390 of the synthetic signal 360 to a block of the start portion of the next $(n+1)^{th}$ frame.

Figure 5:
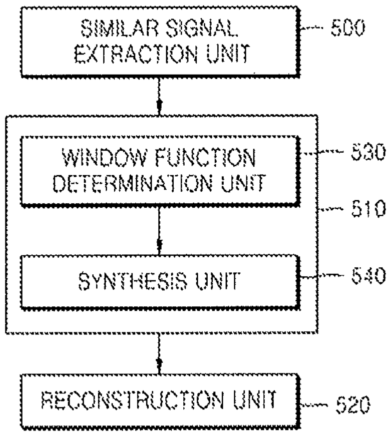
FIG. 5 is a block diagram of a frame error concealment apparatus using an overlapping method according to an exemplary embodiment of the present invention.

Hereinafter, a frame error concealment apparatus using the overlapping method according to an exemplary embodiment of the present invention will be described with reference to FIGS. 3 through 5. FIG. 5 is a block diagram of a frame error concealment apparatus using the overlapping method according to an exemplary embodiment of the present invention. The frame error concealment apparatus includes a similar signal extraction unit 500, a synthetic signal generation unit 510, and a reconstruction unit 520. The synthetic signal generation unit 510 includes a window function determination unit 530 and a synthesis unit 540.

The similar signal extraction unit 500 searches in a search range of a previous frame for two similar blocks having the highest correlation with a signal of the previous block 310 located immediately previous to the $n^{th}$ frame having an error. Let the first found similar block be the first similar block 320 and let the second found similar block be the second similar block 325.

The synthetic signal generation unit 510 generates the synthetic signal 360 for reconstructing the $n^{th}$ frame by synthesizing the first previous signal 350 including the found first similar block 320 and its following first next signal 330 of a predetermined length and the second previous signal 355 including the found second similar block 325 and its following second next signal 335 of a predetermined length. Referring to FIG. 3, the synthetic signal 360 generated by synthesizing the first previous signal 350 and the second previous signal 355 includes the similar block 370, the portion 380 that is directly used for reconstructing the signal of the $n^{th}$ frame, and the overlapping block 390. Since the first similar block 320 and the second similar block 325 have the highest correlation with the previous block 310, the consecutive next signals 330 and 340 following the first similar block 320 and the consecutive next signals 335 and 345 following the second similar block 325 may be similar to the signal of the $n^{th}$ frame. Here, as mentioned previously, the first similar block 320 and the first overlapping (OV) block 340 are included in the first previous signal 350, and the second similar block 325 and the second overlapping (OV) block 345 are included in the second previous signal 355, so as to cause the synthetic signal 360 to include the similar block 370 and the overlapping block 390, thereby preventing the occurrence of discontinuity at the boundary between the synthetic signal 360 and a signal that has been output before or is to be output after the synthetic signal 360 when the synthetic signal 360 is copied to the current frame. In other words, the synthetic signal 360 can be smoothed by overlapping and adding the similar block 370 to the signal preceding the synthetic signal 360 or overlapping and adding the overlapping block 390 to the signal following the synthetic signal 360.

The operations of the window function determination unit 530 and the synthesis unit 540 included in the synthetic signal generation unit 510 will now be described.

The window function determination unit 530 determines the first window function for windowing the first previous signal 350 based on a correlation between the first similar block 320 and the previous block 310 and the second window function for windowing the second previous signal 355 based on a correlation between the second similar block 325 and the previous block 310. Here, it is preferable that the first window function and the second window function be summed as 1. It is also desirable to determine the first window function and the second window function so that the greater weight is applied to one of the first previous signal 350 and the second previous signal 355 whose block has the higher correlation with the previous block 310. By doing so, a previous signal that is more similar to a signal of an error frame than the other previous signal, would be the larger part of the synthetic signal 360 generated by synthesizing the first previous signal 350 and the second previous signal 355 that are windowed by being multiplied by window functions, thereby generating the synthetic signal 360 that more approximates the signal of the error frame.

The window function determination unit 530 may also determine the first window function and the second window function so that in the synthetic signal 360 generated by synthesizing the first previous signal 350 and the second previous signal 355, one of the first previous signal 350 and the second previous signal 355 whose block has the higher correlation with the previous block 310 is faded out and the other previous signal is faded in.

FIGS. 4A, 4B and 4C are reference diagrams for explaining the determination of the first window function and the second window function based on a correlation between the first similar block 320 with the previous block 310 and a correlation between the second similar block 325 with the previous block 310. According to an exemplary embodiment of the present invention, the first window function and the second window function are determined as follows:

$$F(x) = \left(1 - \frac{x}{m}\right)^k \quad (0 \le k \le 1,\ 0 \le x \le m), \qquad (5)$$

where m is the number of time-domain samples constituting the first previous signal 350 and the second previous signal 355 or the synthetic signal 360. As illustrated in FIGS. 4A, 4B and 4C, F(x) is a linear function 410 that reduces from 1 to 0 for k=1 and is a constant function having a value of 1 for k=0. Thus, for 0≤k≤1, F(x) ranges between the linear function 410 and the constant function.

As illustrated in FIGS. 4A, 4B and 4C, the first window function $F_1(x)$ and the second window function $F_2(x)$ are determined as in Equation 6 for the correlation of the first similar block 320 with the previous block 310, which is a higher correlation than the correlation of the second similar block 325 with the previous block 310, and are determined as in Equation 7 for the correlation of the second similar block 325 with the previous block 310, which is a higher correlation than the correlation of the first similar block 320 with the previous block 310.

$$F_1(x) = y = \left(1 - \frac{x}{m}\right)^k,\ F_2(x) = 1 - y \qquad (6)$$
$$k = 1 - (BC1 - BC2)/2$$

$$F_1(x) = 1 - y,\ F_2(x) = y = \left(1 - \frac{x}{m}\right)^k \qquad (7)$$
$$k = 1 - (BC1 - BC2)/2,$$

where BC1 is a correlation between the first similar block 320 and the previous block 310, BC2 is a correlation between the second similar block 325 and the previous block 310, and m is the number of time-domain samples included in the first previous signal 350 and the second previous signal 355 or the synthetic signal 360.

As discussed above, according to an exemplary embodiment of the present invention, the first window function and the second window function are determined so that the greater weight is applied to one of the first previous signal 350 and the second previous signal 355 whose block has the higher correlation with the previous block 310. Additionally, the first window function and the second window function are determined so that one of the first previous signal 350 and the second previous signal 355 whose block has the higher correlation with the previous block 310 is output prior to the other previous signal, thereby causing the synthetic signal 360 generated by synthesizing the first previous signal 350 and the second previous signal 355 that are windowed by the first window function and the second window function, so as to more approximate the signal of the current $n^{th}$ frame.

The synthesis unit 540 windows the firsts previous signal 350 and the second previous signal 355 by multiplying the first previous signal 350 by the first window function and the second previous signal 355 by the second window function and overlaps and adds the first previous signal 350 and the second previous signal 355 to each other, thereby generating the synthetic signal 360.

The reconstruction unit 520 copies the generated synthetic signal 360 to the $n^{th}$ frame at least once, thereby reconstructing the signal of the $n^{th}$ frame. At this time, the reconstruction unit 520 smoothes the start portion of the synthetic signal 360 by overlapping and adding the similar block 370 of the synthetic signal 360 to the previous block 310 of the previous $(n-1)^{th}$ frame, so as to prevent discontinuity at a boundary between the synthetic signal 360 and another signal. Alternatively, the reconstruction unit 520 smoothes the end portion of the synthetic signal 360 by overlapping and adding the overlapping block 390 to a block of the start portion of the next $(n+1)^{th}$ frame.

As mentioned above, the frame error concealment method and apparatus using the overlapping method according to an exemplary embodiment of the present invention generates a new synthetic signal using a plurality of previous signals that are similar to a signal of an error frame and copies the synthetic signal to the error frame so as to conceal the error of the error frame, thereby preventing the generation of modulation noise that may be generated in frame error concealment using a repetition method.

Figure 6:
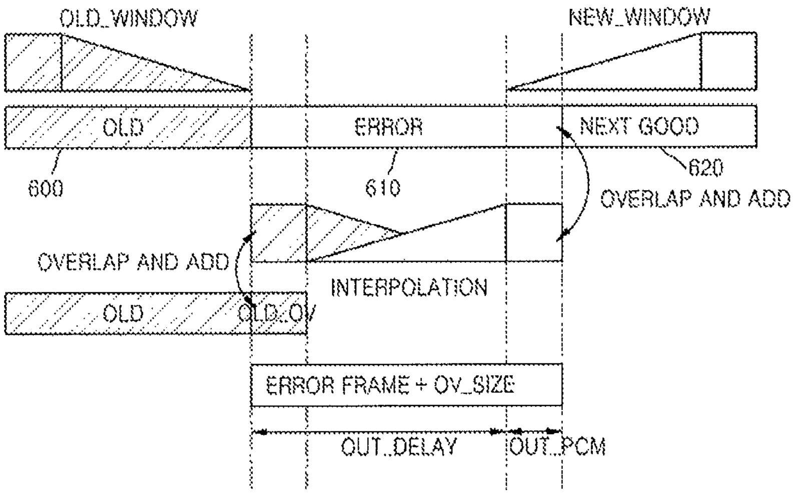
FIG. 6 is a reference diagram for explaining a frame error concealment method using an interpolation method according to an exemplary embodiment of the present invention.

Hereinafter, an adaptive frame error concealment method using an error concealment scheme construction method according to an exemplary embodiment of the present invention will be described. The error concealment scheme construction method constructs an error concealment scheme for a plurality of frames by properly combining the overlapping method, the repetition method, and a frame error concealment method using an interpolation method (hereinafter, referred to as an interpolation method) when errors occur consecutively in the plurality of frames, thereby maximizing reconstructed sound quality. Since the repetition method and the overlapping method have already been described, the interpolation method will be first described with reference to FIG. 6 and then the adaptive frame error concealment method using the error concealment scheme construction method according to an exemplary embodiment of the present invention will be described. FIG. 6 is a reference diagram for explaining the interpolation method according to an exemplary embodiment of the present invention.

Figure 8:
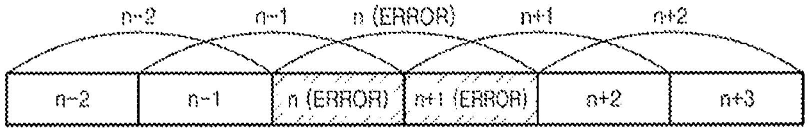
FIG. 8 is a reference diagram for explaining the influence of a frame error in a frequency domain upon a frame in a time domain.

Referring to FIG. 6, the interpolation method applies linear interpolation between a previous frame 600 and a next good frame 620. A future signal is provided in frame units due to a delay problem, and thus relaxed interpolation using a window that is modified for overlapping is applied. The window as illustrated in FIG. 6 is used for relaxed interpolation. The window may use a longitudinal window, a linear function, a polynomial function, or a sine function. FIG. 8 illustrates an example of a window using a linear function. It is noted that when a previous window and a next window overlap with each other, the two windows have to be summed as 1. In FIG. 6, a signal output by relaxed interpolation that overlaps and adds two windows of the same size as a frame further includes a signal of a block having a predetermined overlap size OV_SIZE in addition to a signal of the frame size. The signal of the block is overlapped and added to a signal of the next frame 620, thereby smoothing the rear boundary of a signal reconstructed using the interpolation method. The signal of the block is overlapped and added to a signal of the previous frame 600, thereby smoothing the front boundary of the reconstructed signal.

The foregoing description regarding the overlapping method, the repetition method, and the interpolation method, which conceal a frame error by reconstructing a signal of an error frame in the time domain, will now be followed by a description regarding the characteristics of each of the overlapping method, the repetition method, and the interpolation method.

First, since the overlapping method according to an embodiment of the present invention reconstructs a signal of an error frame using a new synthetic signal generated by synthesizing a plurality of previous signals, modulation noise does not become an issue. However, when an error occurs over a long interval like a burst error, reconstruction of a signal of an error frame using the overlapping method may attenuate the energy of a reconstructed signal. In the case of the repetition method, modulation noise may be an issue when an error occurs over a long interval like a burst error. However, the repetition method maintains the energy of a previous signal without attenuating the energy of the reconstructed signal. The interpolation method may improve the accuracy of a reconstructed signal by reconstructing an error frame using both a previous frame and a next frame, but the next frame has to be a good frame having no error.

As is apparent from the foregoing description, the overlapping method, the repetition method, and the interpolation method have different characteristics in frame error concealment. Therefore, when errors occur consecutively in a plurality of frames, the sound quality of a reconstructed signal can be maximized by constructing an error concealment scheme for concealing the errors of the plurality of frames by properly combining the overlapping method, the repetition method, and the interpolation method based on the different characteristics.

Figure 7:
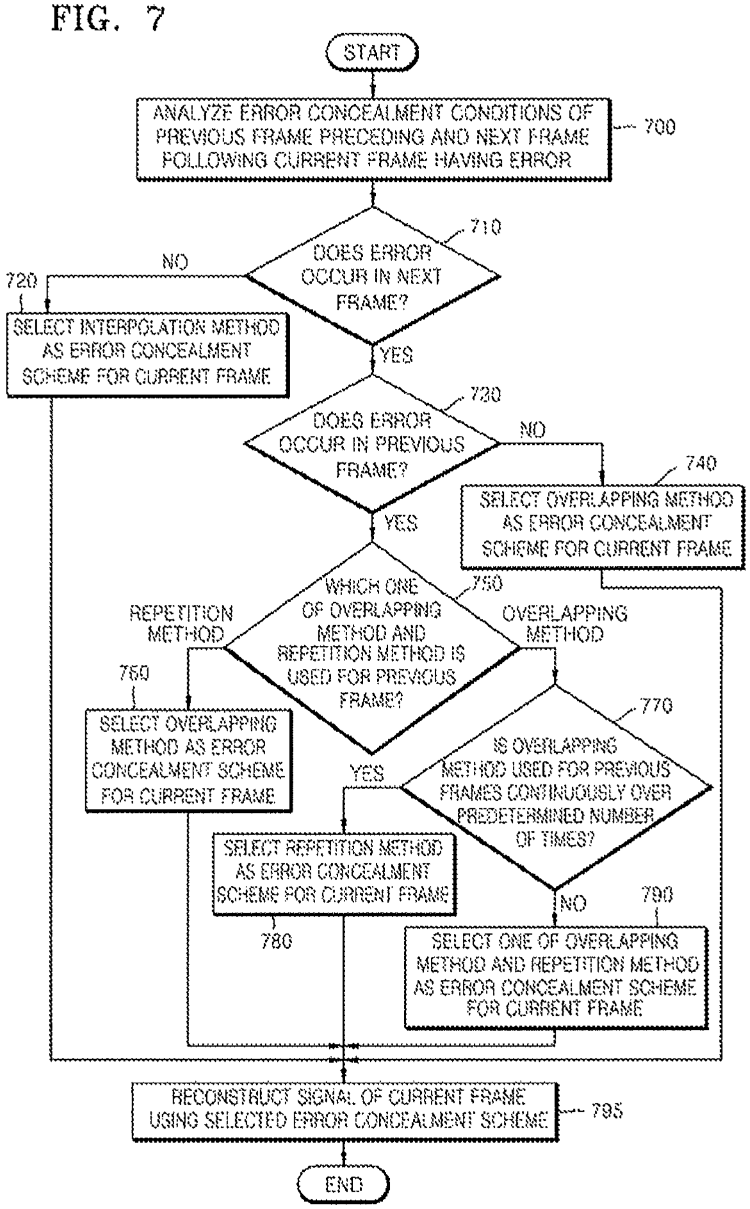
FIG. 7 is a flowchart illustrating an adaptive frame error concealment method using an error concealment scheme construction method according to an exemplary embodiment of the present invention.

Hereinafter, an adaptive frame error concealment method using an error concealment scheme construction method according to an exemplary embodiment of the present invention will be described with reference to FIG. 7.

In operation 700, error concealment conditions of a previous frame preceding and a next frame following the current frame having an error are analyzed. An error concealment scheme for the current frame is selected based on the analysis result and the error of the current frame is concealed according to the selected error concealment scheme in operations 710 through 795. More specifically, it is determined whether the next frame has an error in operation 710. When it is determined that the next frame has no error, i.e., the next frame is a good frame, in operation 710, the interpolation is selected as the error concealment scheme for the current frame in operation 720. When it is determined that the next frame has an error in operation 710, it is further determined whether the previous frame has an error in operation 730. When it is determined that the previous frame has no error, i.e., the previous frame is a good frame, in operation 730, the overlapping method is selected as the error concealment scheme for the current frame in operation 740. When it is determined that the previous frame has an error in operation 730, it is further determined whether the error of the previous frame has been concealed using the overlapping method or the repetition method in operation 750. Since the current frame has an error and thus the error of the previous frame cannot have been concealed using the interpolation method, it is not necessary to determine whether the error of the previous frame has been concealed using the interpolation method. When it is determined that the error of the previous frame has been concealed using the repetition method in operation 750, the overlapping method is selected as the error concealment scheme for the current frame in operation 760. When it is determined that the error of the previous frame has been concealed using the overlapping method in operation 750, it is further determined whether the overlapping method is used continuously over a predetermined number of times in order to conceal errors of previous frames in operation 770. Such a determination is intended to prevent the energy of a signal reconstructed using the overlapping method from being attenuated to a value that is lower than a recommended threshold when the overlapping method is used continuously over the predetermined number of times. When it is determined that the overlapping method is used continuously over the predetermined number of times in operation 770, the repetition method is selected as the error concealment scheme for the current frame in operation 780. When it is determined that the overlapping method is not used continuously over the predetermined number of times in operation 770, one of the overlapping method and the repetition method is selected as the error concealment scheme for the current frame in operation 790. Once the error concealment scheme for the current frame has been selected in operations 710 through 790, a signal of the current frame is reconstructed using the selected error concealment scheme in operation 795.

FIG. 8 is a reference diagram for explaining the influence of a frame error in the frequency domain upon the time domain. Referring to FIG. 8, during modulated discrete cosine transformation (MDCT) with respect to time-domain samples in an encoding phase, a 50% overlap window is generally used. Consequently, when errors occur in N frames in the frequency domain during transmission of an encoded audio signal, errors occur in (N+1) frames in the time domain, in which N is an integer greater than 1. Thus, when an error occurs in a frame in the frequency domain and a signal of the error frame is reconstructed using the repetition method, the same signal is repeated at least three times, causing modulation noise. Therefore, it is necessary to construct an error concealment scheme by properly combining the overlapping method, the repetition method, and the interpolation method while avoiding using the repetition method for more than one frame, thereby preventing the generation of modulation noise.

Figure 9A:
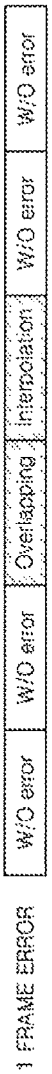
FIGS. 9A through 9C are reference diagrams illustrating error concealment schemes constructed by an error concealment scheme construction method according to an exemplary embodiment of the present invention.
Figure 9B:
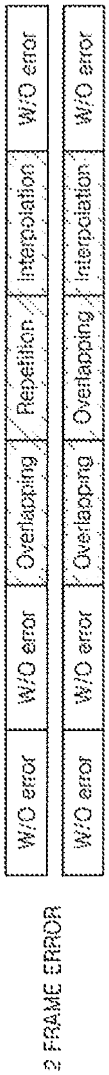
Figure 9C:
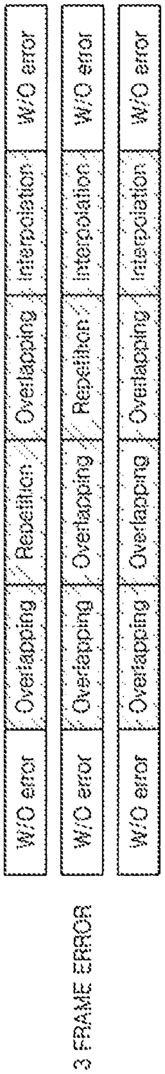

FIGS. 9A through 9C are reference diagrams illustrating error concealment schemes constructed by the error concealment scheme construction method according to an exemplary embodiment of the present invention. An error occurs in a single frame in the frequency domain in FIG. 9A, errors occur in two frames in FIG. 9B, and errors occur in three frames in FIG. 9C. In FIGS. 9A through 9C, 'W/O ERROR' indicates a good frame having no error, and 'OVERLAPPING', 'REPETITION', and 'INTERPOLATION' indicate respective selected error concealment schemes. It can be seen from FIGS. 9A through 9C that an error of the current frame is concealed using the interpolation method when the next frame is a good frame and is concealed using the overlapping method when the previous frame is a good frame, i.e., the error starts from the current frame. Additionally, it can be seen that a frame whose error is concealed using the repetition method is inserted between frames whose errors are concealed using the overlapping method and the repetition method is not used continuously.

Figure 10:
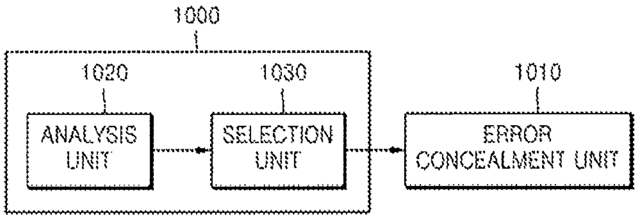
FIG. 10 is a block diagram of an adaptive frame error concealment apparatus including an error concealment scheme construction apparatus according to an exemplary embodiment of the present invention.

FIG. 10 is a block diagram of an adaptive frame error concealment apparatus including an error concealment scheme construction apparatus according to an exemplary embodiment of the present invention. Referring to FIG. 10, the adaptive frame error concealment apparatus includes an error concealment scheme selection unit 1000 and an error concealment unit 1010. The error concealment scheme selection unit 1000 includes an analysis unit 1020 and a selection unit 1030.

The analysis unit 1020 analyzes error concealment conditions of a previous frame preceding and a next frame following the current frame having an error. The error concealment conditions may include information about whether an error occurs in the previous frame and if so, an error concealment scheme for the previous frame, information about whether an error occurs in the next frame, and information about whether the overlapping method has been used continuously over a predetermined number of times to conceal the error of the previous frame.

The selection unit 1030 selects an error concealment scheme for the current frame from the overlapping method, the repetition method, and the interpolation method in the time domain based on the analysis result obtained by the analysis unit 1020.

For example, if the analysis result shows that the previous frame is a good frame, the selection unit 1030 may select the overlapping method as the error concealment scheme for the current frame. If the analysis result shows that the repetition method has been used for the previous frame, the selection unit 1030 may select one of the overlapping method and the interpolation method as the error concealment scheme for the current frame. If the analysis result shows that the overlapping method has been used continuously over the predetermined number of times to conceal the error of the previous frame, the selection unit 1030 may select one of the repetition method and the interpolation method as the error concealment scheme for the current frame. If the analysis result shows that the next frame is a good frame, the selection unit 1030 may select the interpolation method as the error concealment scheme for the current frame.

More specifically, the selection unit 1030 operates as follows. First, the selection unit 1030 determines whether an error occurs in the next frame based on the analysis result obtained by the analysis unit 1020. When the selection unit 1030 determines that the next frame is a good frame, it selects the interpolation method as the error concealment scheme for the current frame. When the selection unit 1030 determines that an error occurs in the next frame, it further determines whether an error occurs in the previous frame. When the selection unit 1030 determines that the previous frame is a good frame, it selects the overlapping method as the error concealment scheme for the current frame. When the selection unit 1030 determines that an error occurs in the previous frame, it further determines whether the error of the previous frame has been concealed using the overlapping method or the repetition method. Since the current frame has an error and thus the error of the previous frame cannot have been concealed using the interpolation method, it is not necessary to determine whether the error of the previous frame has been concealed using the interpolation method. When the selection unit 1030 determines that the error of the previous frame has been concealed using the repetition method, it selects the overlapping method as the error concealment scheme for the current frame. When the selection unit 1030 determines that the error of the previous frame has been concealed using the overlapping method, it further determines whether the overlapping method has been used continuously over a predetermined number of times in order to conceal errors of previous frames. Such a determination is intended to prevent the energy of a signal reconstructed using the overlapping method from being attenuated to a value that is lower than a recommended threshold when the overlapping method is used continuously over the predetermined number of times. When the selection unit 1030 determines that the overlapping method is used continuously over the predetermined number of times, it selects the repetition method as the error concealment scheme for the current frame. When the selection unit 1030 determines that the overlapping method is not used continuously over the predetermined number of times, it selects one of the overlapping method and the repetition method as the error concealment scheme for the current frame.

The error concealment unit 1010 reconstructs a signal of the current frame using the error concealment scheme selected by the selection unit 1030, thereby concealing the error of the current frame.

As described above, the adaptive frame error concealment method and apparatus using the error concealment scheme construction method according to an exemplary embodiment of the present invention construct an error concealment scheme for the current frame having an error by properly combining the overlapping method, the repetition method, and the interpolation method based on the characteristics of these methods, thereby reconstructing a signal of the current signal while maximizing reconstructed sound quality. By reconstructing a signal of an error frame using time-domain frame error concealment, the adaptive frame error concealment method and apparatus may also be implemented by using a stand alone structure that is independent of a core codec. In other words, a signal of the current frame can be reconstructed using only time-domain signals of a previous frame preceding or a next frame following the current frame. Moreover, since a frame error is concealed using the overlapping method, the repetition method, and the interpolation method without a need for a complex process such as the analysis of a signal of the previous frame, an embodiment of the present invention can be implemented with a simple structure. In addition, a frame error can be concealed at the minor cost of one-frame delay.

Meanwhile, the present invention can be embodied as code that is readable by a computer, including a device having an information processing function, on a computer-readable recording medium. The computer-readable recording medium includes all kinds of recording devices storing data that is readable by a computer system. Examples of the computer-readable recording medium include read-only memory (ROM), random access memory (RAM), CD-ROMs, magnetic tapes, floppy disks, optical data storage devices, and the like.

As described above, the frame error concealment method and apparatus using the overlapping method according to the present invention synthesize a plurality of previous signals to reconstruct a signal of an error frame, thereby preventing the generation of modulation noise.

Moreover, the error concealment scheme construction method and apparatus according to the present invention construct an error concealment scheme for a plurality of consecutive error frames by properly combining the overlapping method, the repetition method, and the interpolation method, thereby maximizing reconstructed sound quality.

Furthermore, the adaptive frame error concealment method and apparatus according to the present invention conceal errors of a plurality of consecutive error frames by properly combining the overlapping method, the repetition method, and the interpolation method, thereby maximizing reconstructed sound quality.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. An error concealment method comprising:

selecting, by at least one processing device, one from among a plurality of error concealment schemes including a repetition and smoothing scheme, for a current frame in a signal including at least one of audio and speech, based on error occurrence of a previous frame preceding the current frame and the current frame, and an error concealment scheme used in the previous frame;

concealing, by the at least one processing device, the current frame in a time domain, based on the selected error concealment scheme;

generating a reconstructed audio or speech signal based on the concealed current frame, as an audio or speech output signal.

2. The method of claim 1, wherein the selecting comprises:

when both the current frame and the previous frame are erased frames, determining whether the previous frame as one of the erased frames uses the repetition and smoothing scheme; and selecting one of the repetition and smoothing scheme and a scheme other than the repetition and smoothing scheme, as an error concealment scheme of the current frame as another of the erased frames, in response to the determining.

3. An error concealment apparatus comprising:

a selector, implemented by at least one processing device, configured to select one from among a plurality of error concealment schemes including a repetition and smoothing scheme, for a current frame in a signal including at least one of audio and speech, based on error occurrence of a previous frame preceding the current frame and the current frame, and an error concealment scheme used in a previous erased frame; and a concealment unit, implemented by at least one processing device, configured to conceal the current frame in a time domain, based on the selected error concealment scheme, and to generate a reconstructed audio or speech signal based on the concealed current frame, as an audio or speech output signal.

4. The apparatus of claim 3, wherein when both the current frame and the previous frame are erased frames, the selector is configured to determine whether the previous frame as one of the erased frame frames uses the repetition and smoothing scheme and to select one of the repetition and smoothing scheme and a scheme other than the repetition and smoothing scheme, as an error concealment scheme of the current frame as another of the erased frames, in response to determining whether the previous frame as the one of the erased frames uses the repetition and smoothing scheme.

* * * * *